(12) United States Patent
Beck et al.

(10) Patent No.: US 9,285,016 B2
(45) Date of Patent: Mar. 15, 2016

(54) MULTI-RATIO TRANSMISSION

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 7 days.

(21) Appl. No.: 14/378,351

(22) PCT Filed: Jan. 10, 2013

(86) PCT No.: PCT/EP2013/050352
§ 371 (c)(1),
(2) Date: Aug. 13, 2014

(87) PCT Pub. No.: WO2013/124082
PCT Pub. Date: Aug. 29, 2013

(65) Prior Publication Data
US 2015/0018157 A1    Jan. 15, 2015

(30) Foreign Application Priority Data

Feb. 24, 2012  (DE) .......................... 10 2012 202 811

(51) Int. Cl.
*F16H 3/62* (2006.01)
*F16H 3/44* (2006.01)
(Continued)

(52) U.S. Cl.
CPC .. *F16H 3/62* (2013.01); *F16H 3/66* (2013.01); *F16H 2200/0065* (2013.01); *F16H 2200/2012* (2013.01); *F16H 2200/2046* (2013.01)

(58) Field of Classification Search
CPC ................ F16H 2200/0065; F16H 2200/2012; F16H 2200/2046
See application file for complete search history.

(56) References Cited

U.S. PATENT DOCUMENTS 3,999,448 A  12/1976  Murakami et al.
4,395,925 A   8/1983  Gaus
(Continued)

FOREIGN PATENT DOCUMENTS

DE   29 63 969 A1   4/1981
DE   199 12 480 A1  9/2000
(Continued)

OTHER PUBLICATIONS

German Search Report Corresponding to DE 10 2012 202 810.2 mailed Nov. 13, 2012.
(Continued)

*Primary Examiner* — Tisha Lewis
(74) *Attorney, Agent, or Firm* — Davis & Bujold, P.L.L.C.; Michael J. Bujold

(57) ABSTRACT

A transmission with nine forward and one reverse gear having four planetary gearsets, eight shafts and six shifting elements. The sun gears of gearsets (P1, P3) couple shaft (5), and can couple the housing by brake (05). Input shaft (1) can couple, via clutch (14), shaft (4), which couples carrier and sun gears of respective gearsets (P3, P2) and can couple housing via brake (04). Shaft (1) can couple, via clutch (17), shaft (7), which couples ring gear of gearset (P3) and can couple, via clutch (18), shaft (8) which couples ring gear and carrier of respective gearsets (P4, P2). Shaft (6) couples ring gear and carrier gear of respective gearsets (P2, P4). Shaft (3) couples sun gear of gearset (P4) and can couple, via brake (03), the housing. Output shaft (2) couples carrier and ring gear of respective gearsets (P4, P1).

17 Claims, 3 Drawing Sheets

(51) Int. Cl.
*F16H 3/68* (2006.01)
*F16H 3/66* (2006.01)

(56) References Cited

U.S. PATENT DOCUMENTS

| | | | |
|---|---|---|---|
| 6,572,507 | B1 | 6/2003 | Korkmaz et al. |
| 6,960,149 | B2 | 11/2005 | Ziemer |
| 7,549,942 | B2 | 6/2009 | Gumpoltsberger |
| 7,699,743 | B2 | 4/2010 | Diosi et al. |
| 8,210,981 | B2 | 7/2012 | Bauknecht et al. |
| 8,210,982 | B2 | 7/2012 | Gumpoltsberger et al. |
| 8,398,522 | B2 | 3/2013 | Bauknecht et al. |
| 2007/0225108 | A1* | 9/2007 | Kamm ............ F16H 3/66 475/275 |
| 2008/0009382 | A1* | 1/2008 | Kamm ............ F16H 3/666 475/276 |
| 2009/0197733 | A1 | 8/2009 | Phillips et al. |

FOREIGN PATENT DOCUMENTS

| | | |
|---|---|---|
| DE | 101 15 995 A1 | 10/2002 |
| DE | 10 2005 010 210 A1 | 9/2006 |
| DE | 10 2006 006 637 A1 | 9/2007 |
| DE | 10 2008 000 428 A1 | 9/2009 |
| DE | 10 2008 000 429 A1 | 9/2009 |
| DE | 10 2008 041 193 A1 | 2/2010 |
| DE | 10 2008 041 195 A1 | 2/2010 |
| DE | 10 2008 041 211 A1 | 2/2010 |
| DE | 10 2009 019 046 A1 | 11/2010 |
| DE | 10 2009 020 442 A1 | 11/2010 |
| DE | 10 2009 052 148 A1 | 5/2011 |

OTHER PUBLICATIONS

German Search Report Corresponding to DE 10 2012 202 811.0 mailed Nov. 13, 2012.
German Search Report Corresponding to DE 10 2012 202 812.9 mailed Nov. 13, 2012.
German Search Report Corresponding to DE 10 2012 202 813.7 mailed Nov. 13, 2012.
International Search Report Corresponding to PCT/EP2013/050351 mailed Mar. 18, 2013.
International Search Report Corresponding to PCT/EP2013/050352 mailed Mar. 18, 2013.
International Search Report Corresponding to PCT/EP2013/050353 mailed Mar. 18, 2013.
International Search Report Corresponding to PCT/EP2013/050355 mailed Mar. 18, 2013.
Written Opinion Corresponding to PCT/EP2013/050351 mailed Mar. 18, 2013.

\* cited by examiner

| Gear | Shifting elements closed | | | | | | Gear ratio i | Gear interval φ |
|---|---|---|---|---|---|---|---|---|
| | Brake | | | Clutch | | | | |
| | 03 | 04 | 05 | 14 | 17 | 18 | | |
| 1 | × | | × | | × | | 3.984 | |
| 2 | × | | × | × | | | 2.471 | 1.612 |
| 3 | × | | | × | × | | 1.719 | 1.438 |
| 4 | × | | | × | | × | 1.328 | 1.294 |
| 5 | | | | × | × | × | 1.000 | 1.328 |
| 6 | | × | | × | | × | 0.796 | 1.256 |
| 7 | | | × | | × | × | 0.676 | 1.177 |
| 8 | | × | × | | | × | 0.543 | 1.246 |
| 9 | | × | | | × | × | 0.442 | 1.227 |
| R | × | × | | | × | | −3.453 | Total 9.008 |
| M | × | × | | | | × | 1.328 | |
| M | × | | × | | | × | 1.328 | |
| M | × | | | | × | × | 1.328 | |

| Gear | Shifting elements closed | | | | | | Gear ratio i | Gear Interval φ |
|---|---|---|---|---|---|---|---|---|
| | Brake | | | Clutch | | | | |
| | 03 | 04 | 05 | 14 | 18 | 57 | | |
| 1 | x | | x | | | x | 3.984 | |
| 2 | x | | x | x | | | 2.471 | 1.612 |
| 3 | x | | | x | | x | 1.719 | 1.438 |
| 4 | x | | | x | x | | 1.328 | 1.294 |
| 5 | | | | x | x | x | 1.000 | 1.328 |
| 6 | | | x | x | x | | 0.796 | 1.256 |
| 7 | | | x | x | | x | 0.676 | 1.177 |
| 8 | | x | x | x | | | 0.543 | 1.246 |
| 9 | | x | | x | | x | 0.442 | 1.227 |
| R | x | x | | | | x | -3.453 | Total 9.008 |
| M | x | x | | x | | | 1.328 | |
| M | x | | x | x | | | 1.328 | |
| M | x | | | x | x | | 1.328 | |

Fig. 5

MULTI-RATIO TRANSMISSION

This application is a National Stage completion of PCT/EP2013/050352 filed Jan. 10, 2013, which claims priority from German patent application serial no. 10 2012 202 811.0 filed Feb. 24, 2012.

FIELD OF THE INVENTION

The present invention concerns a multi-ratio transmission of planetary design, in particular an automatic transmission for a motor vehicle.

BACKGROUND OF THE INVENTION

According to the prior art, automatic transmissions, in particular for motor vehicles, comprise planetary gearsets which are shifted by means of frictional or shifting elements such as clutches and brakes, and are usually connected with a starting element which can be operated with slip and is optionally provided with a bridging clutch, such as a hydrodynamic torque converter or a fluid coupling.

Such an automatic transmission is known, for example, from DE 199 12 480 B4 by the present applicant. It comprises three single-carrier planetary gearsets as well as three brakes and two clutches for engaging six forward gears and one reverse gear, a drive input shaft and a drive output shaft, wherein the carrier of the first planetary gearset is connected permanently to the ring gear of the second planetary gearset, the carrier of the second planetary gearset to the ring gear of the third planetary gearset and the drive input shaft is connected directly to the sun gear of the second planetary gearset.

Furthermore, in this known transmission it is provided that the drive input shaft can be connected by the first clutch to the sun gear of the first planetary gearset and by the second clutch to the carrier of the first planetary gearset, the sun gear of the first planetary gearset can be connected by the first brake to a housing of the transmission and the carrier of the first planetary gearset can be connected by the second brake to the housing of the transmission, whereas the sun gear of the third planetary gearset can be connected by the third brake to the housing of the transmission. The drive output shaft of the transmission is connected permanently to the carrier of the third planetary gearset and to the ring gear of the first planetary gearset.

In addition a 9-gear multi-stage transmission is known from DE 29 36 969 A1; this comprises eight shifting elements and four planetary gearsets, one planetary gearset serving as the upstream gearset and the main transmission comprising a Simpson gearset and a further planetary gearset that serves as a reversing gearset.

Other multi-stage transmissions are known, for example, from DE 10 2005 010 210 A1 and DE 10 2006 006 637 A1 by the present applicant.

In general, automatically shifted vehicle transmissions of planetary design have already been described many times in the prior art and are continually undergoing further development and improvement. These transmissions should take up little structural space, in particular requiring a small number of shifting elements, and in sequential shifting operations should avoid double shifts, i.e. an engagement or disengagement of two shifting elements at a time, so that for shifting operations in defined gear groups in each case only one shifting element is changed.

From DE 10 2008 000 428 A1 by the present applicant a multi-stage transmission of planetary design is known, which comprises a drive input and a drive output arranged in a housing. In this known transmission there are at least four planetary gearsets, denoted in what follows as the first, second, third and fourth planetary gearsets, at least eight rotating shafts—denoted in what follows as the drive input shaft, the drive output shaft and the third, fourth, fifth, sixth, seventh and eighth shafts—and at least six shifting elements including brakes and clutches, whose selective engagement produces various gear ratios between the drive input and the drive output, so that preferably nine forward gears and one reverse gear can be produced.

In this case the first and second planetary gearsets, preferably designed as minus planetary gearsets, namely ones with a negative fixed transmission gear ratio, form a shiftable upstream gearset whereas the third and fourth planetary gearsets form a main gearset.

In this known multi-stage transmission it is provided that the carriers of the first and second planetary gearsets are coupled with one another by the fourth shaft, which is connected to an element of the main gearset, the ring gear of the first planetary gearset is coupled to the sun gear of the second planetary gearset by way of the eighth shaft, which can be connected detachably to the drive input shaft by a first clutch, and the sun gear of the first planetary gearset can be coupled by means of the third shaft, via a first brake, to a housing of the transmission and can be detachably connected, via a second clutch, to the drive input shaft, whereas the ring gear of the second planetary gearset can be coupled by means of the fifth shaft, via a second brake, to a housing of the transmission. In addition the seventh shaft is permanently connected to at least one element of the main gearset and can be coupled by a third brake to the housing of the transmission, whereas the sixth shaft is permanently connected to at least one further element of the main gearset and can be detachably connected to the drive input shaft by means of a third clutch; the drive output shaft is permanently connected to at least one further element of the main gearset.

Preferably, in this known transmission the fourth shaft is permanently connected to the ring gear of the third planetary gearset, whereas the sixth shaft is permanently connected to the ring gear of the fourth planetary gearset and to the carrier of the third planetary gearset, and can be detachably connected by the third clutch to the drive input shaft. Furthermore, the seventh shaft is connected permanently to the sun gears of the third and fourth planetary gearsets and can be coupled by the third brake to a transmission housing. In this case the drive output takes place by way of the drive output shaft which is permanently connected to the carrier of the fourth planetary gearset. In addition, the third and fourth planetary gearsets can be combined or reduced to a Ravigneaux gearset with a common carrier and a common ring gear.

According to the state of the art, the shifting elements of multi-stage transmissions designed in that way, which are usually in the form of disk clutches or disk brakes, are actuated hydraulically, but this results disadvantageously in high hydraulic losses. To avoid these actuation losses, it would be particularly advantageous to use shifting elements that can be actuated only as required, for example electro-mechanically actuated shifting elements.

To enable the use of shifting elements that can be actuated as required, the shifting elements, clutches in particular, have to be easily accessible from outside.

Shifting elements that can be actuated as required are understood to mean, in particular, ones that need energy only for changing their shifting condition. This also includes hydraulically actuated shifting elements whose shifting condition can be maintained by closing a valve.

SUMMARY OF THE INVENTION

The purpose of the present invention is to propose a multi-stage transmission of the type mentioned to begin with, comprising nine forward gears and one reverse gear having appropriate gear ratios, wherein the structural complexity, component loading and overall size are optimized, and in addition the efficiency in terms of drag losses and gearing losses is improved. Furthermore the shifting elements of the transmission should be easily accessible from outside, whereby the fitting of shifting elements that can be actuated as required is facilitated. Moreover, the transmission should be suitable for both standard and also front-transverse mounting designs.

A multi-stage transmission of planetary design according to the invention is proposed, which comprises a drive input and a drive output. Furthermore, at least four planetary gearsets, called the first, second, third and fourth planetary gearsets in what follows, eight rotating shafts—called the drive input shaft, the drive output shaft and the third, fourth, fifth, sixth, seventh and eighth shafts in what follows—and six shifting elements, preferably in the form of frictional shifting elements or interlocking shifting elements, including brakes and clutches, are provided, whose selective engagement produces various gear ratios between the drive input and the drive output, such that preferably nine forward gears and one reverse gear can be obtained.

The planetary gearsets of the transmission are preferably designed as minus planetary gearsets.

As is known, a simple minus planetary gearset has a sun gear, a ring gear and a carrier on which planetary gearwheels are mounted to rotate, and each of the planetary gearwheels meshes with the sun gear and the ring gear. Thus, if the carrier is held fixed, the ring gear rotates in the opposite direction to the sun gear. In contrast a simple plus planetary gearset has a sun gear, a ring gear and a carrier on which inner and outer planetary gearwheels are mounted to rotate, such that all the inner planetary gearwheels mesh with the sun gear and all the outer planetary gearwheels mesh with the ring gear and each inner planetary gearwheel meshes with a respective outer planetary gearwheel. Accordingly, if the carrier is held fixed, the ring gear rotates in the same direction as the sun gear and the fixed transmission gear ratio is positive.

In a preferred embodiment of the invention the sun gear of the first planetary gearset is connected to the fifth shaft, which is connected to the sun gear of the third planetary gearset and can be coupled by a third brake to the housing of the transmission, whereas the drive input shaft can be detachably connected by a first clutch to the fourth shaft, which is connected to the carrier of the third planetary gearset and to the sun gear of the second planetary gearset and which can be coupled by a second brake to the transmission housing. In addition, the drive input shaft can be detachably connected by a second clutch to the seventh shaft, which is connected to the ring gear of the third planetary gearset, whereas the drive input shaft can also be detachably connected by a third clutch to the eighth shaft, which is connected to ring gear of the fourth planetary gearset and to the carrier of the second planetary gearset.

Moreover, the sixth shaft of the transmission is connected to the ring gear of the second planetary gearset and to the carrier of the first planetary gearset, whereas the third shaft of the transmission is connected to the sun gear of the fourth planetary gearset and can be coupled by a first brake to the housing, and whereas the drive output shaft of the transmission is connected to the carrier of the fourth planetary gearset and to the ring gear of the first planetary gearset.

In that the first, second and third clutches are arranged on the drive input shaft and the remaining shifting elements are in the form of brakes, it is ensured that all the shifting elements of the transmission can be accessed easily, so that the shifting elements can be designed as shifting elements that can be actuated as required. In other embodiments shifting elements of the transmission can be in the form of hydraulically actuated shifting elements.

In a further embodiment of the invention, starting with the embodiment just described the second clutch can be replaced by a fourth clutch, whereby the seventh shaft is connected to the sun gear of the third planetary gearset and the drive input shaft is connected to the ring gear of the third planetary gearset. In this case the fourth clutch detachably connects the seventh shaft, which is connected to the sun gear of the third planetary gearset, to the fifth shaft, which is connected to the sun gear of the first planetary gearset, to one another. According to a further development of this embodiment in this case the first clutch can be replaced by a fifth clutch, which detachably connects the fourth shaft to the seventh shaft.

The design of the multi-stage transmission in accordance with the invention ensures that the shifting elements of the transmission are easily accessible, so that the shifting elements can be designed in the form of shifting elements that can be actuated as required. Moreover, particularly for passenger cars, suitable gear ratios are available and the multi-stage transmission has a high overall spread, which improves driving comfort and reduces fuel consumption significantly.

Furthermore, since the multi-stage transmission according to the invention has a small number of shifting elements its structural complexity is reduced considerably. Advantageously, with the multi-stage transmission according to the invention starting can be carried out by means of a hydrodynamic converter, an external starting clutch or even with other suitable external starting elements. It is also conceivable to enable a starting process with a starting element integrated in the transmission. Preferably, a starting element which is actuated in the first forward gear and the reverse gear is suitable.

Moreover, the efficiency of the multi-stage transmission in the main driving gears is good in relation to drag and gearing losses.

Advantageously, the torques imposed on the shifting elements and planetary gearsets of the multi-stage transmission are small, so that wear in the multi-stage transmission is advantageously reduced. Furthermore, since the torques are small the dimensions of the transmission components can be made smaller, whereby the fitting space and the corresponding costs can be reduced. Moreover the shafts, shifting elements and planetary gearsets also rotate at low speeds.

Besides, the transmission according to the invention is designed in such manner as to enable adaptation to various drive-train designs, in terms of both force flow direction and also spatial considerations.

BRIEF DESCRIPTION OF THE DRAWINGS

Below, an example of the invention will be explained in greater detail with reference to the attached figures, which show:

FIG. 5: An example of a shifting scheme for a multi-stage transmission as in FIGS. 3 and 4.

DETAILED DESCRIPTION OF THE PREFERRED EMBODIMENTS

Figures 1, 2:
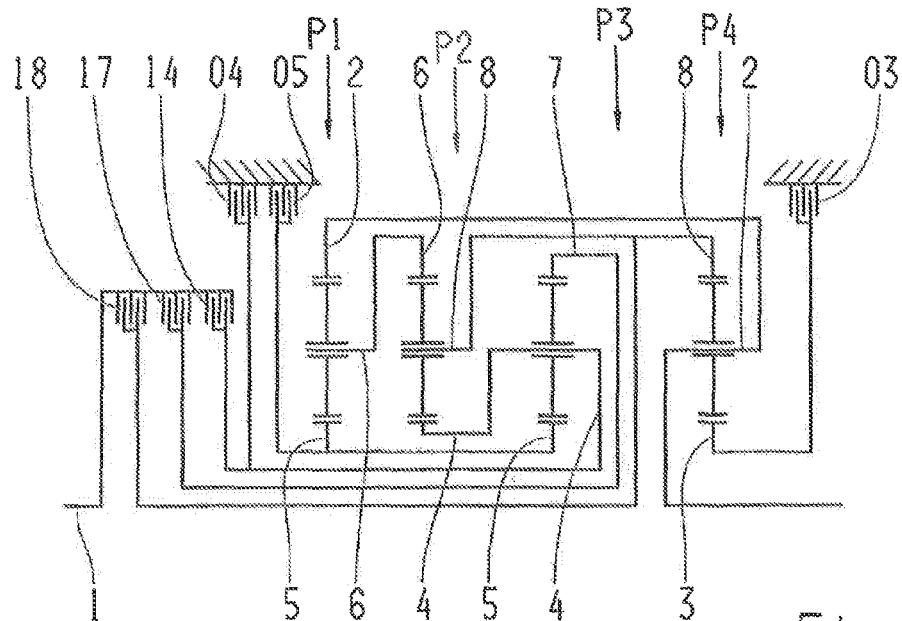
FIG. 1: A schematic representation of a first preferred embodiment of a multi-stage transmission according to the invention.
FIG. 2: An example shifting scheme for a multi-stage transmission as in FIG. 1.

FIG. 1 shows a multi-stage transmission according to the invention having a drive input shaft 1, a drive output shaft 2 and four planetary gearsets P1, P2, P3 and P4, which are arranged in a housing G. In the example shown in FIG. 1 the planetary gearsets P1, P2, P3 and P4 are designed as minus planetary gearsets. According to the invention, at least one of the planetary gearsets P1, P2, P3, P4 can be a plus planetary gearset if at the same time the carrier and ring gear connection is exchanged and, compared with the minus planetary gearset design, the value of the fixed transmission ratio is increased by 1.

In the example embodiment shown, as viewed axially P1, P2, P3 P4 are arranged in the sequence P1 (first planetary gearset), P2 (second planetary gearset), P3 (third planetary gearset and P4 (fourth planetary gearset). According to the invention, the axial sequence of the individual planetary gearsets and the arrangement of the shifting elements can be chosen freely so long as it enables the elements to be connected appropriately.

As can be seen from FIG. 1, six shifting elements are provided, namely three brakes 03, 04, 05, and three clutches 14, 17, 18. The spatial arrangement of the shifting elements can be as desired and is restricted only by their size and the external shape. The clutches and brakes of the transmission are preferably in the form of frictional shifting elements or disk shifting elements, but they can also be interlocking shifting elements.

With these shifting elements a selective engagement of nine forward gears and one reverse gear can be obtained. The multi-stage transmission according to the invention has a total of eight rotating shafts, namely 1, 2, 3, 4, 5, 6, 7 and 8, of which the drive input shaft is the first shaft 1 and the drive output shaft is the second shaft 2 of the transmission.

According to the invention, in the multi-stage transmission of FIG. 1 it is provided that the sun gear of the first planetary gearset P1 is connected to the fifth shaft 5, which is connected to the sun gear of the third planetary gearset P3 and can be coupled by a third brake 05 to the housing G of the transmission, whereas the drive input shaft 1 can be detachably connected by a first clutch 14 to the fourth shaft 4, which is connected to the carrier of the third planetary gearset P3 and to the sun gear of the second planetary gearset P2 and which can be coupled to the housing G by a second brake 04. Referring to FIG. 1, the drive input shaft 1 can be detachably connected by a second clutch 17 to the seventh shaft 7 which is connected to the ring gear of the third planetary gearset P3 and can be detachably connected by a third clutch 18 to the eighth shaft 8, which is connected to the ring gear of the fourth planetary gearset P4 and to the carrier of the second planetary gearset P2.

As can be seen from FIG. 1, the sixth shaft 6 is connected to the ring gear of the second planetary gearset P2 and to the carrier of the first planetary gearset P1, whereas the third shaft 3 is connected to the sun gear of the fourth planetary gearset P4 and can be coupled to the housing G by a first brake 03, and whereas the drive output shaft 2 of the transmission is connected to the carrier of the fourth planetary gearset P4 and to the ring gear of the first planetary gearset P1.

In this case, as viewed axially the first, second and third clutches 14, 17, 18 are preferably arranged next to one another and can be made as disk shifting elements with a common outer disk carrier. In the example embodiment shown the first brake o3 in particular is suitable to be made as a claw shifting element, whereby the fuel consumption is significantly improved.

FIG. 2 shows an example shifting scheme for a multi-stage transmission as in FIG. 1. For each gear three shifting elements are closed. The shifting scheme shows the respective transmission ratios i of the individual gear steps and the gear intervals or step intervals φ to the next-higher gear determined therefrom, the value of the transmission's spread being 9.008 overall.

The values for the fixed transmission ratios of the planetary gearsets P1, P2, P3, P4 designed as minus planetary gearsets in the example shown are −3.900, −2.146, −1.634 and −3.045 respectively. FIG. 2 shows that in a sequential shift pattern, in each case only one shifting element has to be engaged and one shifting element disengaged, since two adjacent gears use two shifting elements together. It can also be seen that a large spread with small gear intervals is achieved.

The first forward gear is obtained by closing the first and third brakes 03, 05 and the second clutch 17, the second forward gear by closing the first and third brakes 03, 05 and the first clutch 14, the third forward gear by closing the first brake 03 and the first and second clutches 14, 17, the fourth forward gear by closing the first brake 03 and the first and third clutches 14, 18, the fifth forward gear, which in the example shown is designed to be a direct gear, is obtained by closing the first, second and third clutches 14, 17, 18, the sixth forward gear by closing the third brake 05 and the first and third clutches 14, 18, the seventh forward gear by closing the third brake 05 and the second and third clutches 17, 18, the eighth forward gear by closing the second and third brakes 04, 05 and the third clutch 18, and the ninth forward gear by closing the second brake 04 and the second and third clutches 17, 18, whereas the reverse gear is obtained by closing the first and second brakes 03, 04 and the second clutch 17.

Alternatively the fourth forward gear can be engaged by other shift combinations, which are indicated as M is FIG. 2. Thus, the fourth forward gear can be obtained by closing the first and third brakes 03, 05 and the third clutch 18, or by closing the first and second brakes 03, 04 and the third clutch 18, or by closing the first brake 03 and the second and third clutches 17, 18.

Since the first brake 03 and the second clutch 17 are closed in both the first forward gear and the reverse gear, these shifting elements can be used as starting elements.

According to the invention, with the same transmission scheme and depending on the shifting logic, different gear intervals can also be obtained so that application-specific or vehicle-specific variation is possible.

Figure 3:
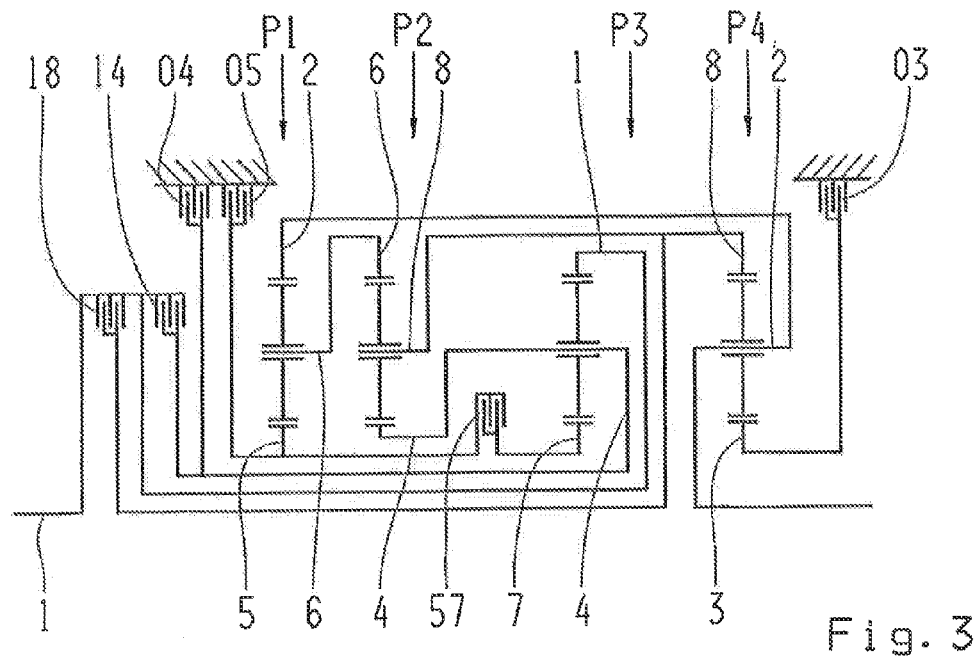
FIG. 3: A schematic representation of a second preferred embodiment of a multi-stage transmission according to the invention.

The example embodiment shown in FIG. 3 corresponds to the example embodiment according to FIG. 1, with the differences that the second clutch 17 is replaced by a fourth clutch 57, the seventh shaft 7 is connected to the sun gear of the third planetary gearset P3, and the drive input shaft 1 is connected to the ring gear of the third planetary gearset P3. In this case the fourth clutch 57 detachably connects to one another the seventh shaft 7, which is connected to the sun gear of the third planetary gearset P3, and the fifth shaft 5 which is connected to the sun gear of the first planetary gearset P1.

In the transmission shown in FIG. 3 the sun gear of the first planetary gearset P1 is connected to the fifth shaft 5, which can be coupled by a third brake 05 to the housing G, whereas the drive input shaft 1 can be detachably connected by a first clutch 14 to the fourth shaft 4, which is connected to the carrier of the third planetary gearset P3 and to the sun gear of the second planetary gearset P2 and which can be coupled to the housing G by a second brake 04. In addition the drive input shaft 1 is connected to the ring gear of the third planetary gearset P3 and can be detachably connected by a third clutch 18 to the eighth shaft 8, which is connected to the ring gear of the fourth planetary gearset P4 and to the carrier of the second planetary gearset P2, whereas the sixth shaft 6 is connected to the ring gear of the second planetary gearset P2 and to the carrier of the first planetary gearset P1, and the third shaft 3 is connected to the sun gear of the fourth planetary gearset P4 and can be coupled to the housing C by a first brake 03. Furthermore, the seventh shaft 7 is connected to the sun gear of the third planetary gearset P3 and can be detachably connected by the fourth clutch 57 to the fifth shaft 5. The drive output shaft 2 is connected to the carrier of the fourth planetary gearset P4 and to the ring gear of the first planetary gearset P1.

As viewed axially, the first and third clutches 14, 18 are preferably arranged next to one another and can be made as disk clutches with a common outer disk carrier.

Figure 4:
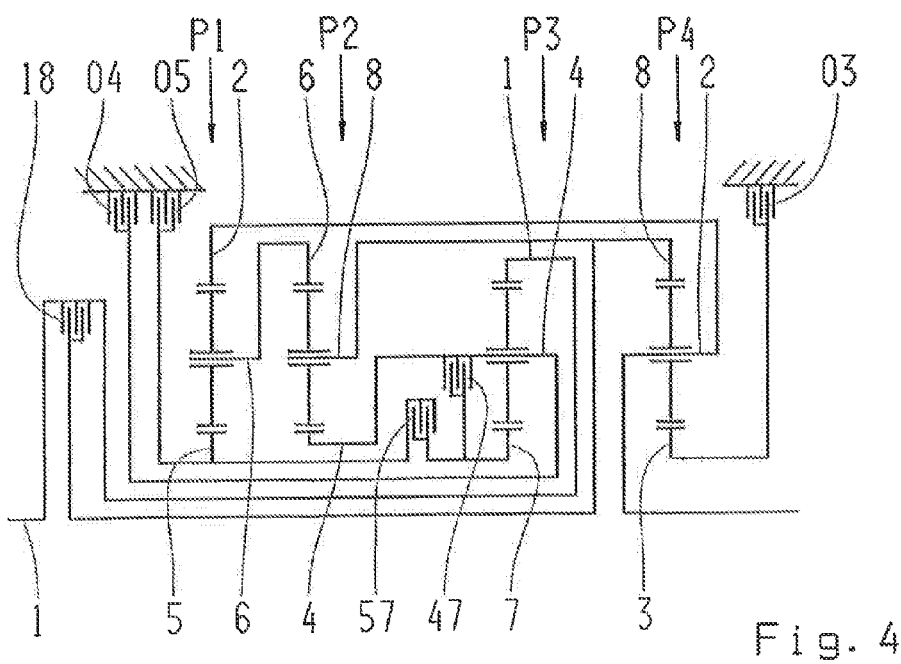
FIG. 4: A schematic representation of a further preferred embodiment of a multi-stage transmission according to the invention.

The transmission shown in FIG. 4 differs from the example embodiment according to FIG. 3 in that the first clutch 14 is replaced by a fifth clutch 47, which detachably connects the fourth shaft 4 to the seventh shaft 7. By closing the first clutch 14 or the fifth clutch 47, the third planetary gearset P3 is blocked.

The object of FIG. 5 is an example shifting scheme for a mufti-stage transmission according to FIG. 3. In the example shown, the values for the fixed transmission ratios of the planetary gearsets P1, P2, P3 P4 designed in the form of minus planetary gearsets are −3.900, −2.146, −1.634 and −3.045 respectively.

The first forward gear is obtained by closing the first and third brakes 03, 05 and the fourth clutch 57, the second forward gear by closing the first and third brakes 03, 05 and the first clutch 14, the third forward gear by closing the first brake 03 and the first and fourth clutches 14, 57, the fourth forward gear by closing the first brake 03 and the first and third clutches 14, 18, the fifth forward gear, which in the example shown is designed to be a direct gear, by closing the first, third and fourth clutches 14, 18, 57, the sixth forward gear by closing the third brake 05 and the first and third clutches 14, 18, the seventh forward gear by closing the third brake 05 and the third and fourth clutches 18, 57, the eighth forward gear by closing the second and third brakes 04, 05 and the third clutch 18, and the ninth forward gear is obtained by closing the second brake 04 and the third and fourth clutches 18, 57, whereas the reverse gear is obtained by closing the first and second brakes 03, 04 and the fourth clutch 57.

According to the invention the fourth forward gear can be engaged by other shift combinations, which are indicated as M in FIG. 4. Thus the fourth forward gear can be obtained by closing the first and second brakes 03, 04 and the third clutch 18, or by closing the first brake 03 and the third and fourth clutches 18, 57, or by closing the first and third brakes 03, 05 and the third clutch 18.

In the case when as shown in the embodiment according to FIG. 4 the first clutch 14 is replaced by a fifth clutch 47 which detachably connects the fourth shaft 4 to the seventh shaft 7, then in the shifting scheme according to FIG. 5 the first clutch 14 is replaced by the fifth clutch 47.

According to the invention, it is also optionally possible to provide additional freewheels at any suitable point in the multi-stage transmission, for example between a shaft and the housing or to connect two shafts when necessary.

On the drive input side or on the drive output side an axle differential and/or a transfer box differential can be arranged.

In an advantageous further development of the invention the drive input shaft 1 can if necessary be separated from a drive engine by a clutch element, wherein for the clutch element, a hydrodynamic converter, a hydraulic clutch, a dry starting clutch, a wet starting clutch, a magnetic power clutch or a centrifugal force clutch can be used. It is also possible to arrange such a starting element behind the transmission in the force flow direction, and in that case the drive input shaft 1 is connected permanently to the crankshaft of the drive engine.

The multi-stage transmission according to the invention also enables a torsion oscillation damper to be arranged between the drive engine and the transmission.

In a further embodiment of the invention (not illustrated), it is possible to arrange on any shaft, preferably on the drive input shaft 1 or the drive output shaft 2, a wear-free brake such as a hydraulic or electric retarder or the like, this being particularly appropriate for use in commercial vehicles. Furthermore, a power-take-off drive can be provided on any shaft, preferably on the drive input shaft 1 or the drive output shaft 2, for driving additional aggregates.

The frictional shifting elements used can be in the form of powershift clutches or brakes. In particular, friction-locking clutches or brakes such as disk clutches, band brakes and/or cone clutches can be used.

A further advantage of the multi-stage transmission proposed herein is that an electric machine can be connected to any shaft as a generator and/or as an additional drive machine.

INDEXES

1 First shaft, drive input shaft
2 Second shaft, drive output shaft
3 Third shaft
4 Fourth shaft
5 Fifth shaft
6 Sixth shaft
7 Seventh shaft
8 Eighth shaft
03 First brake
04 Second brake
05 Third brake
14 First clutch
17 Second clutch
18 Third clutch
57 Fourth clutch
47 Fifth clutch
G Housing
P1 First planetary gearset
P2 Second planetary gearset
P3 Third planetary gearset
P4 Fourth planetary gearset
i Transmission ratio
φ Gear interval

The invention claimed is:

1. An automatic multi-stage transmission of a planetary design for a motor vehicle, the multi-stage transmission comprising:
   a drive input shaft (1) and a drive output shaft (2);
   first, second, third and fourth planetary gearsets (P1, P2, P3, P4) being arranged within a housing (G), and each of the first planetary gearset (P1), the second planetary gearset (P2), the third planetary gearset (P3) and the fourth planetary gearset (P4) comprises a sun gear, a ring gear and a carrier;

third, fourth, fifth, sixth, seventh and eighth rotating shafts (3, 4, 5, 6, 7, 8);

six shifting elements (03, 04, 05, 14, 17, 18) comprising first, second and third brakes (03, 04, 05) and first, second and third clutches (14, 17, 18), and selective engagement of the first, the second and the third brakes and the first, the second and the third clutches producing various transmission ratios between the drive input shaft (1) and the drive output shaft (2) such that nine forward gears and one reverse gear can be implemented;

the sun gear of the first planetary gearset (P1) being connected to the fifth shaft (5), the fifth shaft (5) being connected to the sun gear of the third planetary gearset (P3) and being connectable to the housing (G) by the third brake (05);

the drive input shaft (1) being detachably connectable, by the first clutch (14), to the fourth shaft (4), the fourth shaft (4) being connected to the carrier of the third planetary gearset (P3) and to the sun gear of the second planetary gearset (P2), and the fourth shaft (4) being connectable to the housing (G) by the second brake (04);

the drive input shaft (1) being detachably connectable, by the second clutch (17), to the seventh shaft (7), the seventh shaft (7) being connected to the ring gear of the third planetary gearset (P3), and the drive input shaft (1) being detachably connectable, by the third clutch (18), to the eighth shaft (8) being connected to the ring gear of the fourth planetary gearset (P4) and the carrier of the second planetary gearset (P2);

the sixth shaft (6) being connected to the ring gear of the second planetary gearset (P2) and the carrier of the fourth planetary gearset (P4), and the third shaft (3) being connected to the sun gear of the fourth planetary gearset (P4) and being connectable, by the first brake (03), to the housing (G); and the drive output shaft (2) being connected to the carrier of the fourth planetary gearset (P4) and to the ring gear of the first planetary gearset (P1).

2. The multi-stage transmission according to claim 1, wherein the first, the second, the third and the fourth planetary gearsets (P1, P2, P3, P4) are designed as minus planetary gearsets.

3. The multi-stage transmission according to claim 1, wherein the first, the second, the third and the fourth planetary gearsets (P1, P2, P3, P4), when viewed axially, are arranged in a sequential order of the first planetary gearset (P1), the second planetary gearset (P2), the third planetary gearset (P3) and the fourth planetary gearset (P4).

4. The multi-stage transmission according to claim 1, wherein the first, the second and the third clutches (14, 17, 18), when viewed axially, are arranged adjacent to one another and as disk shifting elements which have a common outer disk carrier.

5. The multi-stage transmission according to claim 1, wherein the six shifting elements (03, 04, 05, 14, 17, 18) of the multi-stage transmission are designed as shifting elements that are independently, selectively actuatable.

6. The multi-stage transmission according to claim 1, wherein the first brake (03) is an interlocking shifting element.

7. The multi-stage transmission according to claim 1, wherein a first forward gear is implemented by engagement of the first and the third brakes (03, 05) and the second clutch (17), a second forward gear is implemented by engagement of the first and the third brakes (03, 05) and the first clutch (14), a third forward gear is implemented by engagement of the first brake (03) and the first and the second clutches (14, 17), a fourth forward gear is implemented by engagement of the first brake (03), the third clutch (18) and one of the first clutch (14), the second clutch (17), the second brake (04) and the third brake (05), a fifth forward gear is implemented by engagement of the first, the second and the third clutches (14, 17, 18), a sixth forward gear is implemented by engagement of the third brake (05) and the first and the third clutches (14, 18), a seventh forward gear is implemented by engagement of the third brake (05) and the second and the third clutches (17, 18), an eighth forward gear is implemented by engagement of the second and the third brakes (04, 05) and the third clutch (18), a ninth forward gear is implemented by engagement of the second brake (04) and the second and the third clutches (17, 18), and the reverse gear is implemented by engagement of the first and the second brakes (03, 04) and the second clutch (17).

8. The multi-stage transmission according to claim 7, wherein the fourth forward gear is implemented by engagement of the first brake (03) and the first and the third clutches (14, 18).

9. The multi-stage transmission according to claim 7, wherein the fourth forward gear is implemented by engagement of the first and the third brakes (03, 05) and the third clutch (18).

10. The multi-stage transmission according to claim 7, wherein the fourth forward gear is implemented by engagement of the first and the second brakes (03, 04) and the third clutch (18).

11. The multi-stage transmission according to claim 7, wherein the fourth forward gear is implemented by engagement of the first brake (03) and the second and the third clutches (17, 18).

12. A multi-stage automatic transmission of a planetary design for a motor vehicle, the transmission comprises a drive input shaft (1) and a drive output shaft (2);

first, second, third and fourth planetary gearsets (P1, P2, P3, P4) being arranged within a housing (G), each of the first planetary gearset (P1), the second planetary gearset (P2), the third planetary gearset (P3) and the fourth planetary gearset (P4) comprises a sun gear, a ring gear and a carrier;

third, fourth, fifth, sixth, seventh and eighth rotating shafts (3, 4, 5, 6, 7, 8);

first, second and third brakes (03, 04, 05) and first, second and third clutches (14, 17, 18), selective engagement of the first, the second and the third brakes and the first, the second and the third clutches producing various transmission ratios between the drive input shaft (1) and the drive output shaft (2) such that nine forward gears and one reverse gear can be implemented;

the drive input shaft (1) being connectable to the fourth shaft (4) via the first clutch (14);

the drive input shaft (1) being connectable to the seventh shaft (7) via the second clutch (17);

the drive input shaft (1) being connectable to the eighth shaft (8) via the third clutch (18);

the drive output shaft (2) being continuously connected to the carrier of the fourth planetary gearset (P4) and the ring gear of the first planetary gearset (P1);

the third shaft (3) being continuously connected to the sun gear of the fourth planetary gearset (P4) and being connectable, via the first brake (03), to the housing (G);

the fourth shaft (4) being continuously connected to the carrier of the third planetary gearset (P3) and the sun gear of the second planetary gearset (P2) and being connectable, via the second brake (04), to the housing (G);

the fifth shaft (5) being continuously connected to the sun gear of the first planetary gearset (P1) and the sun gear of the third planetary gearset (P3) and being connectable, via the third brake (05), to the housing (G);

the sixth shaft (6) being continuously connected to the ring gear of the second planetary gearset (P2) and the carrier of the first planetary gearset (P1);

the seventh shaft (7) being continuously connected to the ring gear of the third planetary gearset (P3); and the eighth shaft (8) being continuously connected to the ring gear of the fourth planetary gearset (P4) and the carrier of the second planetary gearset (P2).

13. The multi-stage transmission according to claim 12, wherein a first forward gear is implemented by engagement of the first and the third brakes (03, 05) and the second clutch (17), a second forward gear is implemented by engagement of the first and the third brakes (03, 05) and the first clutch (14), a third forward gear is implemented by engagement of the first brake (03) and the first and the second clutches (14, 17), a fourth forward gear is implemented by engagement of the first brake (03), the third clutch (18) and one of the first clutch (14), the second clutch (17), the second brake (04) and the third brake (05), a fifth forward gear is implemented by engagement of the first, the second and the third clutches (14, 17, 18), a sixth forward gear is implemented by engagement of the third brake (05) and the first and the third clutches (14, 18), a seventh forward gear is implemented by engagement of the third brake (05) and the second and the third clutches (17, 18), an eighth forward gear is implemented by engagement of the second and the third brakes (04, 05) and the third clutch (18), a ninth forward gear is implemented by engagement of the second brake (04) and the second and the third clutches (17, 18), and the reverse gear is implemented by engagement of the first and the second brakes (03, 04) and the second clutch (17).

14. The multi-stage transmission according to claim 13, wherein the fourth forward gear is implemented by engagement of the first brake (03) and the first and the third clutches (14, 18).

15. The multi-stage transmission according to claim 13, wherein the fourth forward gear is implemented by engagement of the first and the third brakes (03, 05) and the third clutch (18).

16. The multi-stage transmission according to claim 13, wherein the fourth forward gear is implemented by engagement of the first and the second brakes (03, 04) and the third clutch (18).

17. The multi-stage transmission according to claim 13, wherein the fourth forward gear is implemented by engagement of the first brake (03) and the second and the third clutches (17, 18).

* * * * *